March 20, 1956 L. A. PHILIPP 2,738,652
REFRIGERATING APPARATUS
Filed Feb. 28, 1955 2 Sheets-Sheet 1
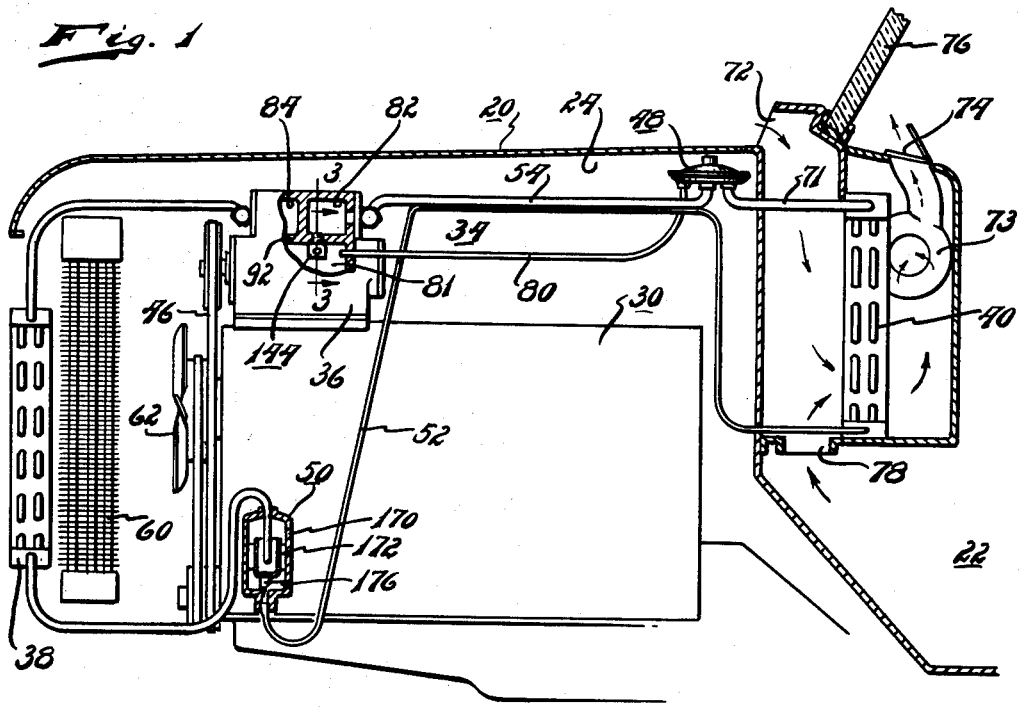
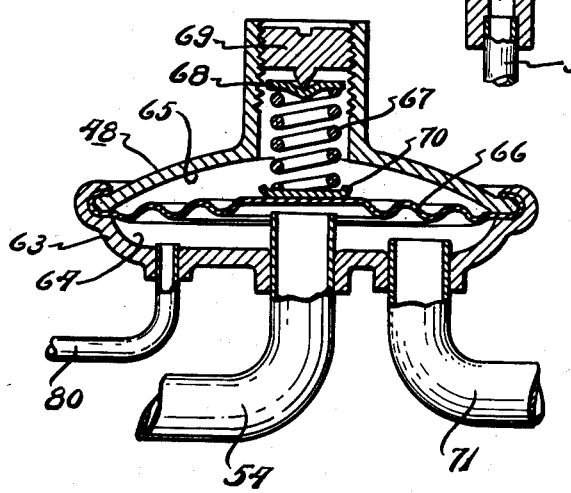
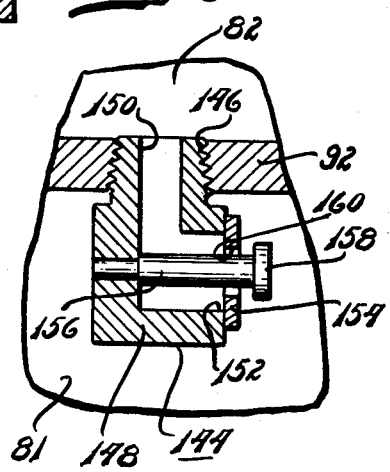
INVENTOR.
LAWRENCE A. PHILIPP
BY
Ralph E. Baker
ATTORNEY

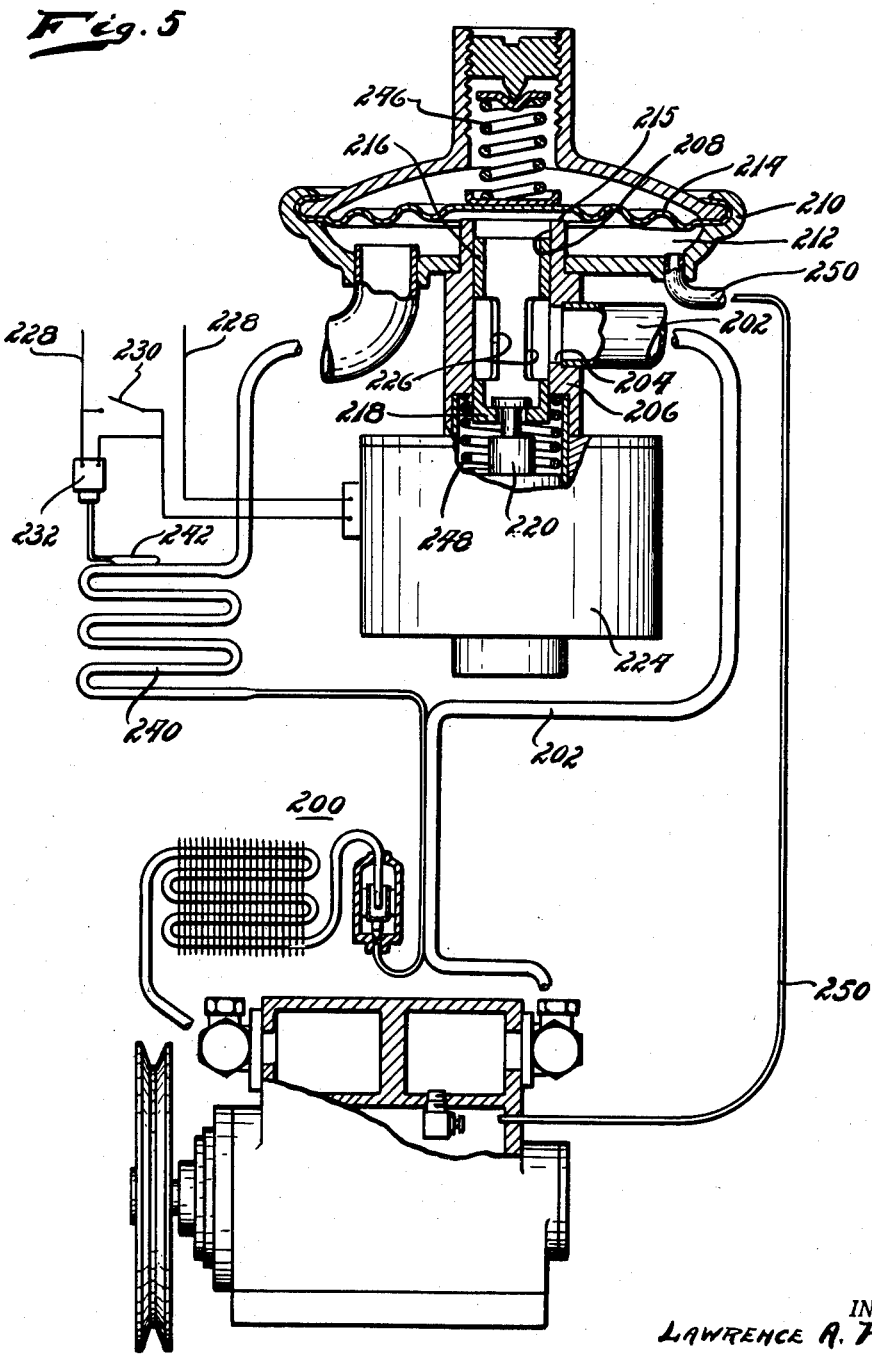

United States Patent Office 2,738,652
Patented Mar. 20, 1956

2,738,652

REFRIGERATING APPARATUS

Lawrence A. Philipp, Detroit, Mich., assignor to American Motors Corporation, Detroit, Mich., a corporation of Maryland Application February 28, 1955, Serial No. 490,879

4 Claims. (Cl. 62—3)

This invention relates to refrigerating apparatus and more particularly to such apparatus which is utilized for the conditioning of air for the passenger compartments of automotive vehicles.

In the conditioning of air for the passenger compartments of automotive vehicles it has been the practice to operate a refrigerant compressor of a refrigerating system by connecting same to the vehicle engine. This arrangement is satisfactory provided the pressure on the lubricant in the compressor crankcase remains above atmospheric pressure. In the event the pressure on the lubricant is not maintained above atmospheric such lubricant foams considerably upon initiation of compressor operatoin which results in destruction of the compressor valves and the removal of such lubricant from the compressor crankcase where it is needed to lubricate the moving parts thereof. Furthermore such compressors are of the so-called open type wherein the crankshaft thereof extends through a wall of the compressor crankcase so that the same may be driven by a pulley-belt arrangement connected to the engine of the vehicle. Such shafts are sealed by shaft seals to prevent the leakage of lubricant from the crankcase and to prevent the infiltration of air into the refrigerating system. By maintaining the pressure on the lubricant above atmospheric pressure there is insured an effective seal so that there is no infiltration of air into the system and the lubricant does not foam to an appreciable extent upon initiation of compressor operation.

It has been previously proposed to utilize magnetic or other type of clutches to disengage the compressor from its driving connection with the vehicle engine when the conditioning of air is not needed. In my invention it is an object to eliminate the necessity of such clutches.

Another object of my invention is to provide an improved arrangement for the continuous operation of a refrigerant compressor of a refrigerating system.

It is another object of my invention to maintain the pressure in a crankcase of a refrigerant compressor above atmospheric pressure so as to minimize the foaming of lubricant upon initiating operation thereof and to insure an effective seal about the compressor crankshaft at the place it extends through the crankcase housing.

Another object of my invention is to by-pass refrigerant around a control valve to the crankcase of a compressor in an amount which is sufficient to maintain a pressure above atmospheric on the lubricant in such crankcase.

Another object of the present invention is to provide an improved refrigerating system having the refrigerant compressor directly coupled to be driven during the operation of an engine of a motor vehicle so that when the refrigerant compressor is stopped due to either a failure in operation or a deliberate stopping of the engine, the refrigerant pressure within the system will rapidly and almost instantly be balanced so that the refrigerant pressure on the suction and discharge sides of the compressor will be equalized thereby unloading the compressor to permit an easier and readier restart of the engine.

Further objects and advantages of the present invention will be apparent from the following description, reference being had to the accompanying drawings, wherein a preferred form of the present invention is clearly shown.

In the drawings:

Fig. 1 is a diagrammatic illustration of a refrigerating system and automotive vehicle embodying features of my invention;

Fig. 2 is an enlarged fragmentary view in cross section of the regulating control valve shown in Fig. 1, embodying features of my invention;

Fig. 3 is an enlarged view taken along the line 3—3 of Fig. 1, embodying features of my invention, Figure 4 is an enlarged sectional view of the float valve, and Fig. 5 is a diagrammatic illustration of a modified refrigerating system embodying features of my invention.

In accordance with my invention I provide a refrigerating system for the conditioning of air for the passenger compartments of motor vehicles. In this system the compressor is driven by the engine of the vehicle and is arranged to be in operation continuously with the operation of the engine to thus eliminate the use of clutches. In order to prevent the possibility of reducing the pressure on the lubricant in the crankcase of the compressor below atmospheric pressure I have arranged to deliver some refrigerant vapors from the evaporator into the crankcase of the compressor by by-passing the evaporator outlet valve. This minimizes foaming of such lubricant and insures an effective seal of the crankshaft of the compressor. I have found that a pressure of approximately 8 pounds per square inch above atmospheric pressure is satisfactory for this purpose.

Referring to the drawings, the numeral 20 designates in general a motor vehicle having a passenger compartment 22 and an engine compartment 24. Within the engine compartment 24 is a variable speed engine 30.

A refrigerating system 34 is positioned within the vehicle 20 and is used for cooling the air entering the passenger compartment 22. The system includes in general, a compressor 36, a condenser 38 and a refrigerant evaporator 40. The compressor 36 is driven at variable speeds by the engine 30 continuously during operation of the engine through a pulley-belt arrangement designated in general by the numeral 46.

During operation of the engine 30 evaporated refrigerant is withdrawn from the evaporator 40 under the control of a pressure regulating valve 48 by the compressor 36 which compresses same and delivers it to the condenser 38 wherein it is liquified and from which it is delivered to the evaporator 40 under the control of a high side float 50 and a small diameter tube 52. The tube 52 is bonded to a suction or vapor return conduit 54 leading from the valve 48 to the intake side of the compressor 36 to cool the liquid in conduit 52 to prevent the formation of vapor in the conduit 52 to insure that only liquid will enter the evaporator 40. The tube or conduit 52 is of small diameter to keep the pressure up so that expansion will not take place at the outlet of valve 50. Under these conditions the expansion of refrigerant takes place at the inlet of the evaporator 40. The system 34 has a low pressure side leading from the inlet of the evaporator to the inlet of the compressor 36 including the crankcase thereof and a high pressure side leading from the outlet of the compressor to the inlet of the evaporator 40.

Positioned between the engine 30 and condenser 38 is the radiator 60 of the vehicle. The incoming air cools the condenser 38 and radiator 60 when the vehicle is in motion and a fan 62 driven by the engine 30 causes movement of air over the condenser and radiator during operation of the engine to dissipate heat from the condenser and the radiator.

The pressure regulating valve 48 may be of any of the well known types responsive to changes in pressures within the evaporator to throttle the outlet thereof and keep the pressure therein sufficiently high during conditions of operation. This prevents the evaporator from operating at an excessively low temperature that may cause excess condensation of moisture from the air being cooled to freeze out upon the surfaces of the evaporator. As shown the valve includes a two piece casing 63 divided into chambers 64 and 65 by a diaphragm 66. The chamber 65 is sealed at atmospheric pressure. Within the chamber 65 is a coiled spring 67 having one end in engagement with a plate 68 which is held in place by an adjustable plug 69 and the other end in engagement with a plate 70 carried by the diaphragm 66. The vapor return conduit 54 has a portion thereof extending into chamber 64. The evaporator 40 has an outlet pipe 71 which extends into chamber 64 but not as far as the conduit 54 extends thereinto. Thus the pressure in the chamber 64 is the same as the pressure in the evaporator 40. The valve 48 may be set by adjustable plug 69 to keep the pressure in the evaporator 40 any desired value when the system is in operation for conditioning air.

During forward movement of the vehicle air enters same by ram pressure and in this instance it enters through a cowl ventilator opening 72 whence it passes over the evaporator 40 aided by the action of a fan 73. The cooled air enters the passenger compartment 22 from an outlet 74 adjacent the windshield 76 of the vehicle. This conditioned air is circulated throughout the compartment 22 and due to the action of the fan 73 it moves into opening 78 to again flow over the evaporator 40 for further conditioning. The opening 78 may be controlled by a damper (not shown). Various dampers and heaters (not shown) may be used for controlling and heating the air for compartment 22, however for the purpose of simplicity in disclosing this invention the same have been omitted. When the vehicle is not moving, the fan 73 circulates the air over the evaporator 40.

In order to maintain the pressure in the crankcase of the compressor at about 8 pounds per square inch above atmospheric pressure, I have provided the regulating valve 48 with a by-pass conduit 80. This conduit 80 as disclosed is positioned between the chamber 64 and the crankcase 81. The compressor includes an intake chamber 82 and a discharge chamber 84. The chambers 82 and 84 are in communication with the compressor cylinders (not shown) of the compressor in the usual manner.

The by-pass conduit 80 is preferably about three feet long and .051 of an inch internal diameter. This conduit 80 provides a bleed passage from the chamber 64 to the compressor crank case 81 to thus insure the flow of refrigerant from the evaporator 40 to the compressor crankcase even though the valve 48 is closed to interrupt the flow of refrigerant into the conduit 54 and then into suction chamber 82 which is in communication with crankcase 81.

An oil return check and relief valve 144 is positioned and secured in a threaded passage 146 extending through partitioned wall 92 between suction chamber 82 and crankcase 81. The valve 144 provides controlled communication between the suction chamber 82 and crankcase 81. The valve 144 comprises a body 148 through which extends a passage 150 providing communication between chamber 82 and crankcase 81. Adapted to close the end or opening 152 of passage 150 is an annular ring 154 mounted on pin 156 secured to the body 148. The ring 154 is movable axially on said pin 156 toward the opening 152, and is limited in its movement away from the opening by pin head 158 of pin 156. The annular opening 160 of the ring 154 is slightly larger than the diameter of pin 156 which projects therethrough so that when the ring 156 moves to close the opening 152 a leakage may take place around the pin through opening 160. Oil separated from refrigerant and deposited in the chamber 82 will return to the crankcase through the valve 144. The valve 144 is a safeguard against a build-up of excessive pressures within the crankcase and in supplying the continuously operating compressor with a minimum flow of refrigerant the valve 144 is arranged to permit a flow of refrigerant from the crankcase to the inlet chamber 82. The ring 154 of the valve 144 normally seats over the opening 152 whenever the suction pressure within the chamber 82 decreases and allows a metered flow through the opening 160 to the chamber 82. Upon an increase in pressure in the suction chamber 82 the ring 154 may unseat from opening 152. The arrangement of the valve 144 also prevents slugs of oil passing to the suction chamber 82 during the initial start of the compressor after being idle when the pressure on the lubricant is being reduced as such pressure cannot be reduced as suddenly as in compressors not equipped with such valves.

When the engine is in operation and it is desired to condition the air for the compartment 22 the fan 73 is placed in operation so that the air entering opening 72 is caused to flow over the surfaces of the evaporator 40 to be cooled thereby. The fan may be manually started or it may be of the automatic thermostatically controlled type. When such air passes over the surface of the evaporator the refrigerant therein absorbs heat from the air which causes the refrigerant to vaporize. The vaporized refrigerant is withdrawn from the evaporator 40 by the compressor 36 under the control of the pressure operated regulating valve 48 which is responsive to changes in pressures in the evaporator 40. The valve 48 may remain completely closed when the pressure in the evaporator 40 is below a certain point at which time no refrigerant from the evaporator is being conducted to the suction chamber 82 or crankcase 81. However during periods when air conditioning is desirable and when the fan 73 is operating there will be sufficient vaporization take place in the evaporator 40 resulting in sufficient pressure therein to operate valve 48 thus permitting vaporous refrigerant to flow to the chamber 82 to maintain the pressure in the crankcase above atmospheric. The compressor 36 compresses such vaporous refrigerant and delivers it into the compressor discharge chamber 84 which is in open communication with the inlet of the condenser 38 wherein the refrigerant is condensed. The condensed refrigerant enters the high side float 50 which includes a casing 170 which houses a float bucket 172 which carries a valve proper 176 which is of the needle valve type. The valve 176 is machined or flattened on one side as at 180 to provide a so called cracked valve to provide an arrangement for unloading the compressor when the compressor stops for any reason. During operation liquid refrigerant enters bucket 172 and overflows causing the bucket to rise as the level of liquid rises in casing 170 to thus lift valve 176 from its seat to meter the flow of liquid refrigerant to the evaporator in the usual manner. When the compressor stops, the valve 176 due to cut away portion 180, permits the pressures on the high and low pressure sides of the system to equalize since refrigerant vapors are free to pass through the cracked valve. The unloading takes place in a matter of seconds and permits an easier start of the engine 30. When the pressure in the chamber 64 is above a certain value such pressure acts on the underside of diaphragm 66 and against the action of spring 67 to keep the diaphragm above the inlet to conduit 54 to thus permit the flow of refrigerant from the evaporator 40 to the compressor through conduit 54. When the pressure in the chamber 64 falls below such certain value the spring 67 will overcome the action of such pressure to cause the diaphragm to engage the end of conduit 54 to thus prevent the refrigerant in chamber 64 from entering conduit 54 to flow to the compressor suction chamber.

In view of the fact that the compressor 36 operates at all times when the engine 30 is in operation the conduit 80 is provided. During periods when air conditioning is not desired and the fan is not in operation there may not be sufficient vaporization take place in the evaporator to cause operation of valve 48 and no refrigerant would move from the evaporator to the suction chamber of the compressor thus resulting in a reduction of pressure in the crankcase. However, due to the by-pass conduit 80 such pressure will not fall below the aforesaid certain value. The conduit 80 is always prepared to meter the flow of vaporous refrigerant from the evaporator to the crankcase to keep the pressure therein above said certain value. In the modified form shown in Fig. 5 the arrangement of the refrigerating system 200 and construction of parts are similar to that shown and described in the preferred form except that the shut-off arrangement may be made responsive to the temperature of the evaporator or be manually operated to positively shut off the flow in the vapor return conduit whenever desired. The system may be installed in a vehicle like shown in Fig. 1 and in the same manner. The vapor return conduit 202 is connected in communication with a radially extended passage 204 formed in a sleeve 206 that communicates with an axially directed bore 208 formed therein. The sleeve 206 is secured to a valve body 210 and extends into a chamber 212 one wall of which is formed by a diaphragm 214. The diaphragm is adapted to seat upon a terminal end 215 of sleeve 206 to close communication between the chamber 212 and bore 208. Axially slideable in the bore 208 is a tubular member 216 having its lower end closed by wall 218 to which is secured a plunger 220 movable within and responsive to a solenoid coil 224 which is secured to the lower end of the sleeve 206. Peripheral slots 226 are formed through the tubular member 216 in alignment with radial passage 204. The open end of tubular member 216 terminates to lie below the end 215 of the sleeve 206 during normal operation of the refrigerating system, and the member 216 is fitted within the sleeve 206 in a close tolerance to minimize leakage of refrigerant therebetween.

The solenoid coil 224 is connected by electrical wires 228 to a suitable source of electrical energy. To control the energization of the solenoid coil 224 there is provided a manually operated switch 230 in the line 228. Also adapted to close an electrical circuit for energizing the solenoid coil, and wired in parallel with the switch 230, is a thermostatically operated switch 232 which is connected in thermal heat erchange relation with the evaporator 240 by feeler bulb 242 extended therefrom.

In operation vaporized refrigerant flows from the evaporator into the chamber 212 of the valve, into bore 208 and tubular member 216 through slots 226, passage 204, and return vapor conduit 202 back to the compressor. As refrigerating needs decrease resulting in lowering of refrigerant pressure in the evaporator, the diaphragm 214 will seat upon the end 215 throttling or closing the passage into the bore 208. To prevent throttling and effect a positive shut-off the thermostatically operated switch 232 will close the circuit to the solenoid coil 224 which upon being energized will axially lift plunger 220 and the tubular member 216. The tubular member 216 will be lifted to abut and seal against the diaphragm 214 and be held thereagainst by compression of spring 246 to prevent refrigerant flow from the chamber 212 to the vapor return conduit 202. The arrangement is such that the solenoid coil will move the tubular member 216 outwardly beyond the end of sleeve 206 into a sealing engagement with the diaphragm lifting it up off the end 215 of the sleeve 206. The spring 246 by this action is more greatly compressed to more tightly seat the diaphragm to the tubular member to prevent fluttering action of the diaphragm. Thus there is provided a more effective means for controlling and regulating the operation of the evaporator. When no refrigeration is required, that is cooling by the evaporator is not desired, the closing of the manual switch 230 will keep the solenoid coil energized to effect a closing of the valve. A compression spring 248 is positioned to engage between sleeve 206 and plunger 220 which acts upon de-energizing of the solenoid coil to axially move and return the tubular member 216 to original position within the sleeve 206 in disengagement from the diaphragm.

When the solenoid coil is energized the flow of refrigerant from the evaporator to the compressor is interrupted. However, a by-pass conduit 250 meters the flow of refrigerant from the evaporator the same as the by-pass conduit 80 disclosed in connection with Fig. 1. The systems disclosed in Figs. 1 and 5 are the same and operates the same with the exception of the provision of the solenoid arrangement in the system disclosed in Fig. 5.

From the foregoing it will be apparent that there has been described and illustrated refrigerating systems whereby the compressor may operate continuously in a satisfactory manner. Furthermore the arrangement is such as to prevent loss of lubricant from the crankcase by maintaining adequate pressures therein to prevent pumping out action during periods when little or no refrigeration is required. By the arrangement of the float valve the pressures in the high and low pressure sides of the system may be quickly equalized upon the halting or stopping of the compressor to permit a free turning compressor during the initial starting period. However, the float valve arrangement does not interfere with normal refrigeration.

Although preferred forms have been illustrated and described in detail, it will be apparent to those skilled in the art that various other modifications may be made therein without departing from the spirit of the invention or from the scope of the appended claims.

I claim:

1. In a refrigerating apparatus, a refrigerant evaporator, a refrigerant compressor having a crankcase, said refrigerant compressor operable continuously for withdrawing vaporized refrigerant from said evaporator, a relatively large flow capacity conduit connecting the outlet of the evaporator with the inlet of the compressor for delivering vaporized refrigerant from said refrigerant evaporator to said compressor, a pressure responsive means interposed in said conduit for regulating the flow through said conduit, a relatively small flow capacity conduit interconnecting said evaporator with said crankcase in continuously open communication therebetween for delivering vaporized refrigerant to said crankcase, a passage for delivering vaporized refrigerant from said crankcase to inlet of said compressor, valve means in said passage for regulating the flow of refrigerant through said passage and conduit means connecting the outlet of said compressor with the inlet of said evaporator.

2. In a refrigerating apparatus, a refrigerant evaporator, a refrigerant compressor having a crankcase, said refrigerant compressor operable continuously and at variable speeds for withdrawing vaporized refrigerant from said evaporator, a relatively large flow capacity conduit connecting the outlet of the evaporator with the inlet of the compressor for delivering vaporized refrigerant from said refrigerant evaporator to said compressor, a pressure responsive means interposed in said large flow capacity conduit for regulating the flow through said conduit, a temperature responsive valve means interposed in said relatively large flow capacity conduit for interrupting the flow through said conduit in response to temperature of said refrigerant evaporator, a relatively small flow capacity refrigerant conduit interconnecting said refrigerant evaporator with said crankcase for delivering vaporized refrigerant to said crankcase, a passage interconnecting said crankcase with the inlet to said compressor for withdrawing vaporized refrigerant within said crankcase by said compressor, valve means in said passage to regulate the flow therethrough and conduit means connecting the outlet of said compressor with the inlet of said evaporator.

3. In a refrigerating apparatus, a refrigerant evaporator, a refrigerant compressor having a crankcase, said refrigerant compressor operable continuously and at variable speeds for withdrawing vaporized refrigerant from said evaporator, a relatively large flow capacity conduit connecting the outlet of the evaporator with the inlet of the compressor for delivering vaporized refrigerant from said refrigerant evaporator to said compressor, a pressure responsive means interposed in said conduit for regulating the flow through said conduit, a manually operated control means interposed in said conduit for interrupting the flow through said conduit, a relatively small flow capacity refrigerant conduit interconnecting said refrigerant evaporator with said crankcase for delivering refrigerant to said crankcase, a passage interconnecting said crankcase with the inlet to said compressor for withdrawing vaporized refrigerant from within said crankcase by said compressor, valve means in said passage to regulate the flow therethrough and conduit means connecting the outlet of said compressor with the inlet of said evaporator.

4. In a refrigerating apparatus, a refrigerant evaporator, a refrigerant compressor having a crankcase, said refrigerant compressor being operable for withdrawing vaporized refrigerant from said evaporator, a refrigerant conduit connecting the evaporator and the compressor for delivering vaporized refrigerant from the evaporator to said compressor, pressure responsive means interposed in said conduit for regulating the flow through said conduit, means providing a restricted passage and interconnecting said evaporator with said crankcase for delivering a restricted quantity vaporized refrigerant to said crankcase, means providing a restricted passage between said crankcase and the inlet of said compressor to limit the flow of refrigerant from said crankcase to said inlet, and conduit means connecting the outlet of said compressor to the inlet of said evaporator.

References Cited in the file of this patent

UNITED STATES PATENTS

| | | |
|---|---|---|
| Re. 23,821 | Davis | May 4, 1954 |
| 1,830,022 | Fourness | Nov. 3, 1931 |
| 2,145,354 | Hull | Jan. 31, 1939 |
| 2,155,051 | Kagi | Apr. 18, 1939 |
| 2,264,821 | Zukoski | Dec. 2, 1941 |
| 2,418,853 | Shoemaker | Apr. 15, 1947 |